United States Patent [19]
Jing et al.

[11] Patent Number: 5,751,787
[45] Date of Patent: May 12, 1998

[54] MATERIALS AND METHODS FOR IMPROVED RADIOGRAPHY

[75] Inventors: Zhenxue Jing; James K. Walker. both of Gainesville, Fla.

[73] Assignee: Nanoptics, Inc., Gainesville, Fla.

[21] Appl. No.: 719,225

[22] Filed: Sep. 25, 1996

Related U.S. Application Data

[63] Continuation-in-part of Ser. No. 711,379, Sep. 5, 1996, abandoned.

[51] Int. Cl.$^6$ ..................... G03B 42/02
[52] U.S. Cl. ............. 378/169; 378/182; 378/183
[58] Field of Search ................ 378/167, 170, 378/169, 182, 183, 184, 185, 186, 187, 188

[56] References Cited

U.S. PATENT DOCUMENTS

| | | | |
|---|---|---|---|
| 4,394,737 | 7/1983 | Komaki et al. | 378/174 |
| 5,380,636 | 1/1995 | Malfatto et al. | 378/185 |
| 5,394,987 | 3/1995 | Markl et al. | 378/185 |
| 5,574,768 | 11/1996 | McLean | 378/186 |

*Primary Examiner*—Don Wong
*Attorney, Agent, or Firm*—Saliwanchik, Lloyd & Saliwanchik

[57] ABSTRACT

This invention pertains to novel methods of radiography and novel screen-film cassettes with wide exposure latitude and/or high film contrast for use in radiography. The materials and methods of the subject invention can be used in mammography. In a specific example, this invention concerns the design of novel screen-film cassettes which can use at least one phosphor screen and multiple x-ray films in a single cassette. When used in mammography, this novel design enables additional breast images to be obtained on the faster, or slower, speed film from the same x-ray exposure used to produce a normal breast image on the normal speed film. These additional breast images provide high contrast information on the dense regions of the breast and in the edge areas of the compressed breast. These dense regions currently cause many missed diagnoses in breast cancer screening. The use of this novel multi-screen, multi-film cassette in mammography has the potential to improve the diagnostic accuracy in breast cancer detection, and simultaneously reduce patient breast glandular dose by eliminating unnecessary exposure due to film retake. Obtaining multiple film images of the same object from a single x-ray exposure can apply to many areas of medical and industrial radiography.

39 Claims, 12 Drawing Sheets

MATERIALS AND METHODS FOR IMPROVED RADIOGRAPHY

This application is a continuation-in-part of application Ser. No. 08/711,379, filed Sep. 5, 1996 now abandoned.

BACKGROUND OF THE INVENTION

Early lesion detection has been shown to significantly reduce breast cancer mortality rates for women over age 50. Screen-film mammography is widely used for early detection of breast cancer. In screen-film mammography, the breast image is formed by recording, on film, the x-ray intensity distribution exiting a compressed breast after exposure of the compressed breast to a uniform x-ray field. The main purpose of mammography is to detect lesions within the breast.

The breast images, or mammograms, are generally obtained from one of two types of screen-film cassettes. The most common screen-film cassette is made of a single phosphor screen, used as a back screen, in combination with a single emulsion film. High image resolution can be achieved because the number of absorbed x-ray photons decreases as a function of depth into the screen. The second type of cassette uses a double emulsion film sandwiched between two phosphor screens. This type of cassette provides higher x-ray absorption efficiency but has a lower spatial resolution. In both cases, only a single film is used.

Unfortunately, there are a number of limitations associated with the use of screen-film cassettes in mammography which reduce its effectiveness in the detection of breast cancer. Specifically, inadequate exposure latitude of the screen-film cassette is a major problem. The exposure latitude of a screen-film cassette is defined as the exposure interval encompassed within the useful density range of the film. Inadequate exposure latitude can adversely affect the lesion contrast on a breast image.

The lesion contrast on the breast image is dependent on the subject contrast and the film contrast, which are independent of each other. Subject contrast is determined by the difference in x-ray attenuation between the lesion and its surrounding area, and is therefore a property of the subject for a given x-ray energy. The film contrast is defined as the slope, or as some function of the slope, of the characteristic curve for a film. The characteristic curve, or the H&D curve, is a plot of the film density of the processed film as a function of the logarithm of the exposure which effectuated such density (Corney, G. M., 1979). For the same type of film and processing condition, however, the film contrast depends on the film density. FIG. 1 shows the H&D curves of two hypothetical films. These curves demonstrate the fundamental compromise between the film contrast and exposure latitude. That is, the steeper the curve, the higher the film contrast, but the narrower the exposure latitude.

Due to the low image contrast nature of breast lesions on mammograms, high film contrast is required for accurate diagnosis in mammography. The typical film contrast of mammographic x-ray films (e.g., Kodak Min-R films) is about 3.5 for film densities ranging from about 1.0 to 2.0. The corresponding exposure latitudes of these mammographic screen-film cassettes, however, are only about 40. Unfortunately, the film contrast drops quickly for film densities below 1.0 or above 2.0 (Haus, Arthur G., 1992).

It has been shown (Maidment et al., 1993) that the x-ray exposure level arriving at the screen can vary by a factor of 400 in a single radiography of a breast. In part, this variation can occur because the portion of the compressed breast nearest the chest wall is thicker than the portion of the compressed breast furthest from the chest wall. In addition, there can be large variations in breast composition throughout the compressed breast. Current practice in mammographic screening often uses automatic exposure control (AEC) devices to produce a constant film density (~1.5) in the center of the compressed breast. As a result, the film densities around the edge of the compressed breast are much greater than 2.0 due to the excessive x-ray exposure to the screen-film cassette in these areas. Therefore, the film contrast is lower for the edge regions.

In mammography, mis-diagnosis frequently occurs when a breast lesion is surrounded by dense fibroglandular tissue (Skubic and Fatouros, 1989; Ma et al., 1992). In this case, the subject contrast is very small due to the subtle difference in x-ray attenuation between the lesion and fibroglandular tissue (Johns and Yaffe, 1987). Additionally, the lower x-ray penetration in these regions can cause low film densities and therefore low film contrast. The low subject contrast combined with the low film contrast makes proper diagnosis more difficult. Consequently, some lesions can go undetected, or in the case of an ambiguous diagnosis the patient is often required to undergo reexamination. This results in additional exposure to ionizing radiation as well as additional psychological stress.

The detection of breast cancer is particularly problematic for young women whose breasts typically have high fibroglandular content. Therefore, in the detection of lesions, higher than normal film contrast is particularly desirable. Unfortunately, with the existing state of the art cassettes, this would correspond to an unacceptably low exposure latitude. There is therefore a need for a cassette which can provide higher than normal film contrast with no corresponding unacceptable drop in exposure latitude. Such a cassette would be particularly advantageous in the routine mammographic scanning of women under the age of 50.

It is therefore desirable to develop new methods and screen-film cassettes with wide exposure latitude and/or high film contrast in order to improve the diagnostic accuracy in early breast cancer detection. Such a development could further reduce breast cancer mortality for all women as well as reduce the need for reexamination of the patient and thus reduce patient exposure to ionizing radiation.

BRIEF SUMMARY OF THE INVENTION

The subject invention pertains to novel methods of medical and industrial radiography and novel screen-film cassettes with wide exposure latitude and/or high film contrast for use in radiography. The materials and methods of the subject invention are particularly advantageous for use in mammography. In a specific example, this invention concerns the design of novel screen-film cassettes which can use at least one phosphor screen and multiple x-ray films in a single cassette. In another embodiment, the screen can be a scintillation fiber optic plate. The combination of screens and films, in the subject invention, produces effective film speeds which can vary by, for example, a factor of at least two between the lowest and highest speed films. There are at least two ways in which the subject invention can be exploited.

First, a cassette can have an effective exposure latitude at least about a factor of two wider than current screen-film cassettes, while maintaining a film contrast as high as current cassettes. When this novel cassette is used in mammography, in addition to a normal breast image obtained on the standard, normal speed film, at least one additional breast image is obtained on the faster, or slower, speed film from the same x-ray exposure. Advantageously, these novel screen-film cassettes allow the dense regions and/or edge areas of the compressed breast to be displayed with high film contrast.

Second, a cassette of the subject invention can have an effective exposure latitude about the same as current cassettes, while having a film contrast of at least about a factor of two greater than current screen-film cassettes. This allows higher image contrast for lesions surrounded by dense fibroglandular tissue. Although this property is of interest in all mammographic procedures, this property is particularly advantageous in mammographic procedures for women under the age of about 50.

The use of these novel screen-film cassettes can significantly improve diagnostic accuracy in breast cancer detection. The design more efficiently uses the x-ray exposure and scintillation light emitted by the phosphor screen(s) to generate an increased amount of important diagnostic information, with no corresponding increase in patient radiation risk.

DETAILED DISCLOSURE OF THE INVENTION

Figure 1:
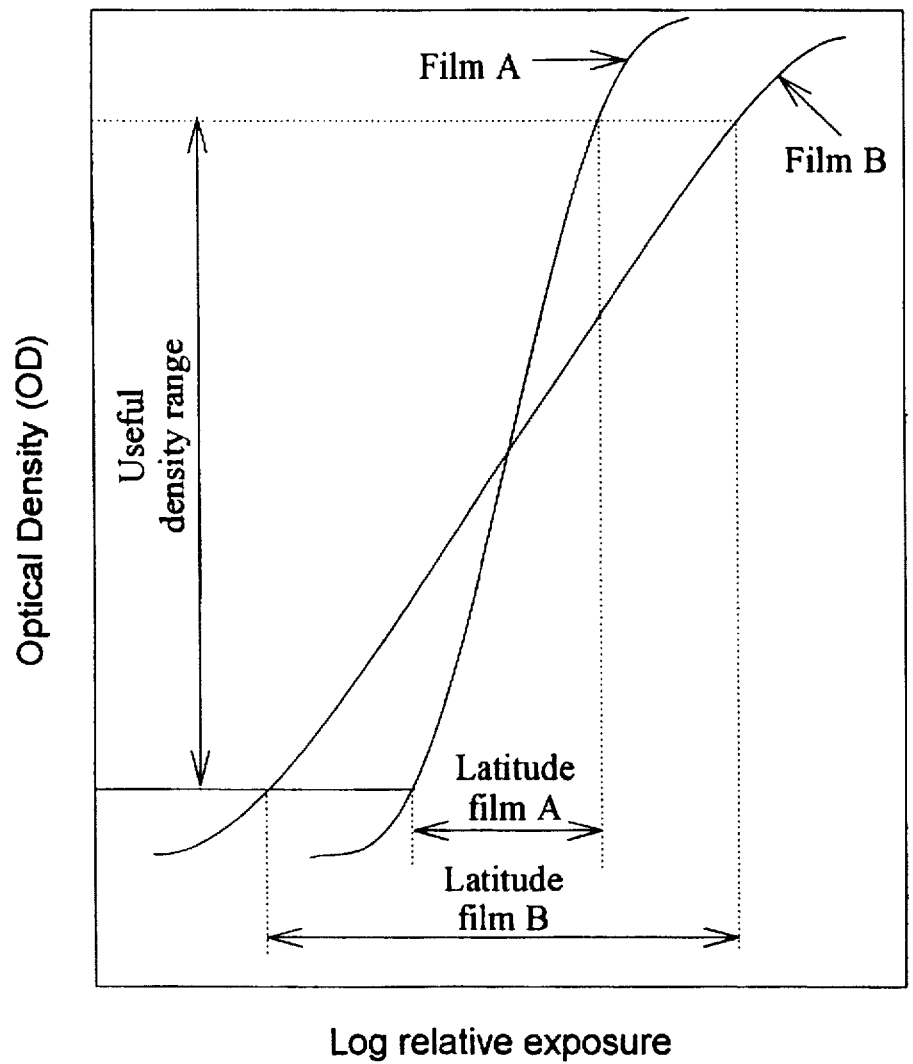
FIG. 1 shows characteristic curves of two hypothetical radiographic films.

The subject invention pertains to novel methods of radiography and novel screen-film cassettes with wide exposure latitude and/or high film contrast for use in radiography. The materials and methods of the subject invention are particularly advantageous for use in mammography. In a specific example, the subject invention concerns the design of novel screen-film cassettes which use at least one phosphor screen and multiple x-ray films in a single cassette. In another embodiment, the screen can be a scintillating fiber optic plate. The combination of screens and films, in the subject invention, produces effective film speeds which can vary by, for example, a factor of at least about two between the lowest and highest speed films. There are at least two ways in which the subject invention can be exploited.

First, a cassette can have an effective exposure latitude at least about a factor of two wider than current screen-film cassettes, while maintaining a film contrast as high as current cassettes. When this novel cassette is used in mammography, in addition to a normal breast image obtained on the standard, normal speed film, at least one additional breast image is obtained on the faster, or slower, speed film from the same x-ray exposure. Advantageously, these novel screen-film cassettes allow the dense regions and/or edge areas of the compressed breast to be displayed with high film contrast.

Second, a cassette of the subject invention can have an effective exposure latitude about the same as current cassettes, while having a film contrast of at least about a factor of two greater than current screen-film cassettes. This allows higher image contrast for lesions surrounded by dense fibroglandular tissue. Although this property is of interest in all mammographic procedures, this property can be particularly advantageous in mammographic procedures for women under the age of about 50.

The use of these novel screen-film cassettes can significantly improve diagnostic accuracy in breast cancer detection. The design of the cassettes more efficiently uses the x-ray exposure and scintillation light emitted by the phosphor screens to generate an increased amount of important diagnostic information, with no corresponding increase in patient radiation risk.

The novel cassettes of the subject invention can be designed such that the screens remain in the cassette, while the films can be introduced and removed during the radiographic procedure. The screen(s) are typically very thin, flexible under their own weight, and susceptible to damage if touched. Therefore, care must be taken during the introduction and removal of the films to ensure the integrity of the screen(s). In a specific embodiment, the screen(s) are connected to the cassette such that the screen(s) can move out of the way during introduction and removal of the film(s). This connection can be, for example, along at least one edge of, or at a corner of, the screen. Additionally, for more physical strength, the screen can have a semi-flexible or rigid frame on at least one edge, which can then be connected to the cassette.

Alternatively, the novel cassettes of the subject invention can be designed such that one or more of the screen(s) can be removed from the cassette as well as allowing the films to be removable. To protect the physical integrity of the screen, the screen can have a semi-flexible or rigid frame on at least one edge, thus providing a mechanism for holding the screen during introduction and removal of the screen from the cassette.

Alternatively, the novel cassettes of the subject invention can be designed such that the cassettes comprise sub-cassettes each of which comprises at least one screen and can accommodate at least one film. These sub-cassettes can be attached together for the radiographic imaging procedure, and detached for storage, changing films, and/or reconfiguring these sub-cassettes. In this way many combinations of screens and films may be achieved by attaching these sub-cassettes together.

In a specific embodiment, when two or more films are exposed at one time, for example by x-rays, the two or more films, after processing, can each be read by a digital scanner. This digital scanner can be, for example, connected to a computer. In a more specific embodiment, the two or more digitized image files can then be analyzed and processed by a computer to produce a composite digital image file.

When forming a composite digital image file from two or more individual digital image files, there may be a slight difference in the magnification of each individual digital image file used, due to the small differences in the distance of each film from the x-ray source. These differences in magnification should be taken into account when forming a composite digital image file. In a specific embodiment, in order to synthesize the individual images into a composite image, the individual digitized images can be scaled to a given image size, for example, that of the first film image.

In a specific embodiment, this scaling can be accomplished by using at least one fiducial mark. In a preferred embodiment, the fiducial mark(s) can be located around the edge of each image. The mark(s) can be produced in each film image, for example, by very small (less than or equal to 25 microns) high density insert(s). These insert(s) can be fixed in the cassette which holds the films during the exposure to x-ray thereby creating the mark(s) in the film image when the film is exposed to x-rays. A scaling algorithm can first be applied to scale each of the individual digitized images to align the fiducial marks of the individual digitized images corresponding to the different films. The same algorithm can then be applied to the digitized images themselves.

The H & D characteristics of the films used to produce the individual digitized film images, which are known for each film, can be encoded and therefore incorporated into the computer program which processes the individual digital images. Thereafter, each individual film's digitized image can be analyzed pixel by pixel in order to adjust each pixel's grey level for the non-linearity of that film's response derived from the film's H & D curves. In a specific example having two films, for a pixel $(i,j)_1$ of film #1 having a non-linearity correction less than a prescribed user defined value, pixel $(i,j)_c$ of the composite image will have grey scale information determined by starting with the grey scale information of $(i,j)_1$ and adjusting for the corresponding non-linearity correction. However, for a pixel $(i,j)_1$ having a non-linearity correction greater than a prescribed user defined value, pixel $(i,j)_c$ can have its grey scale information obtained from another film, for example, pixel $(i,j)_2$ of film #2. In this case, the speed of film #2 has been chosen such that there is a small non-linearity correction required for its corresponding pixel, $(i,j)_2$. The grey scale value of pixel $(i,j)_2$ in film #2 is then scaled by the difference in the measured speed between films #1 and #2 and the resulting grey scale value is used for the pixel $(i,j)_c$ in the composite image. This process can be carried out for all pixels and can be extended to the use of more than two films.

Figure 3:
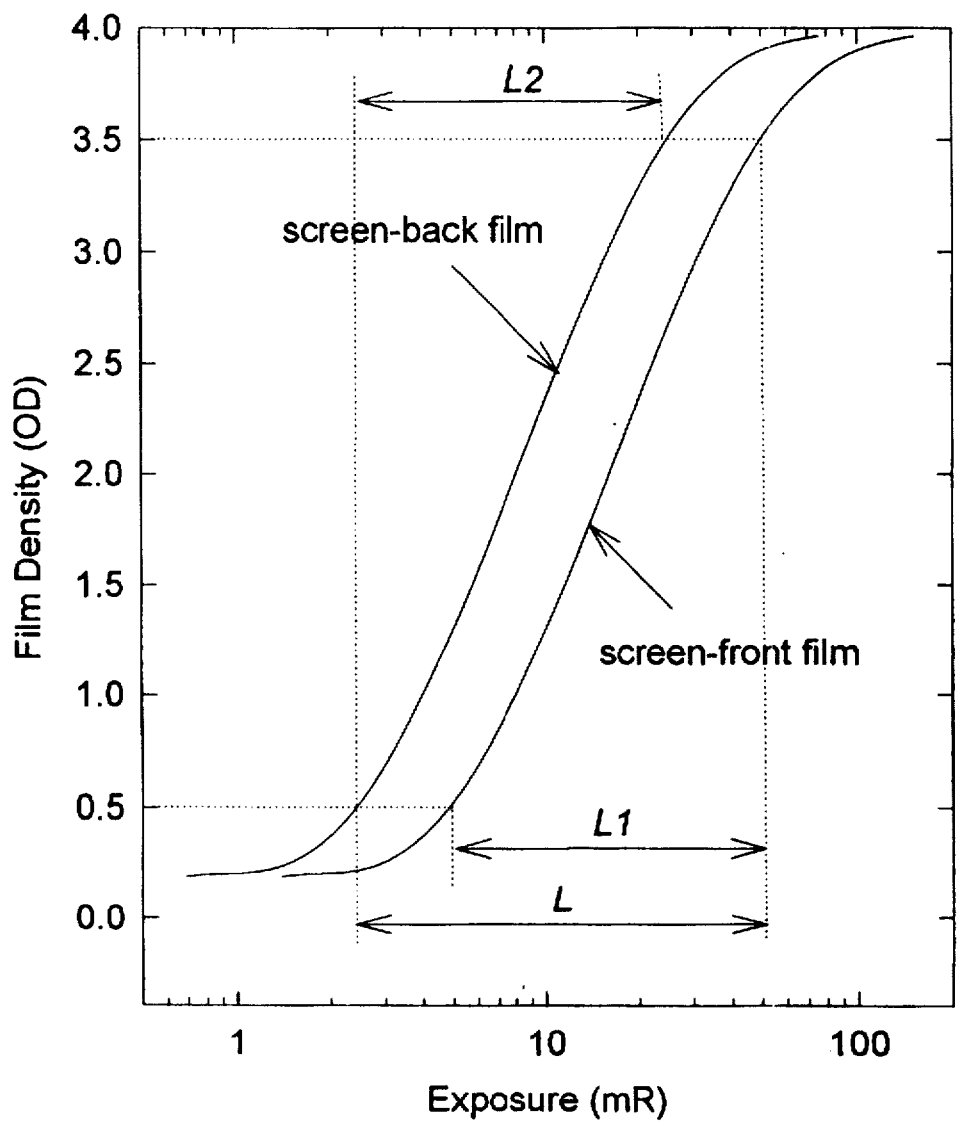
FIG. 3 shows the H&D curves of a single screen-dual film cassette.

The result of this digital processing is the creation of a single composite digitized image which has high resolution, high contrast, and wide latitude. The latitude L, of the composite digitized image is related to the latitudes $L_1, L_2$, . . . . $L_n$ of the individual film images, where n is the total number of films taken. In a specific embodiment having two films, the latitude, L, of the composite digitized image is related to the latitudes, L1 and L2, of the individual film images as shown in FIG. 3. Thus the latitude, L, is bounded by the extremes of the individual latitudes of the individual film images.

In a specific embodiment, the subject invention can be an integrated system. Within this integrated system, two or more films can be exposed by one or more screens upon exposure of a subject to x-rays. Fixed within a cassette housing the screens and films, there can be a marking means, for example, very small high density inserts, which create fiducial marks on all of the films when the cassette is exposed to x-rays. The films can then be processed and then digitized, for example, by a digital scanner. These digital images, although already very valuable for radiographic purposes, can be further processed by, for example, a computer. This computer can have a scaling and alignment algorithm, correlated with the fiducial marks, whereby the film images of the different films are scaled to a common size and aligned with each other. Once the multiple film images are commonly scaled and aligned with each other, these digitized film images can be analyzed pixel by pixel in order to adjust each pixel's grey level for the non-linearity in that film's response derived from the film's H & D curves. In this way, a composite image can be constructed, wherein each pixel of the composite image utilizes a corresponding pixel of a film having a non-linearity correction less than a prescribed user defined value. The grey level of the selected pixel is then adjusted to correct for the non-linearity of that film's response, for the selected pixel. This process can be carried out for all pixels, to produce a composite which incorporates the optimum part of each of the multiple films' images. Thus a single digital image can be produced which has a latitude covering the extremes of the partially overlapping latitudes of the individual films.

Once a composite digital image is produced, this composite digital image can be used to perform computer assisted diagnosis. For example, this composite digital image can be transmitted by telephone wire lines, fiber optic lines, radio, and other like communication links for remote diagnosis. In addition, this composite digital image can be stored on magnetic or optical disks, or other like digital archiving media for subsequent analysis or interpretation.

Following are examples which illustrate procedures for practicing the invention. These examples should not be construed as limiting.

EXAMPLE 1

Figure 2:
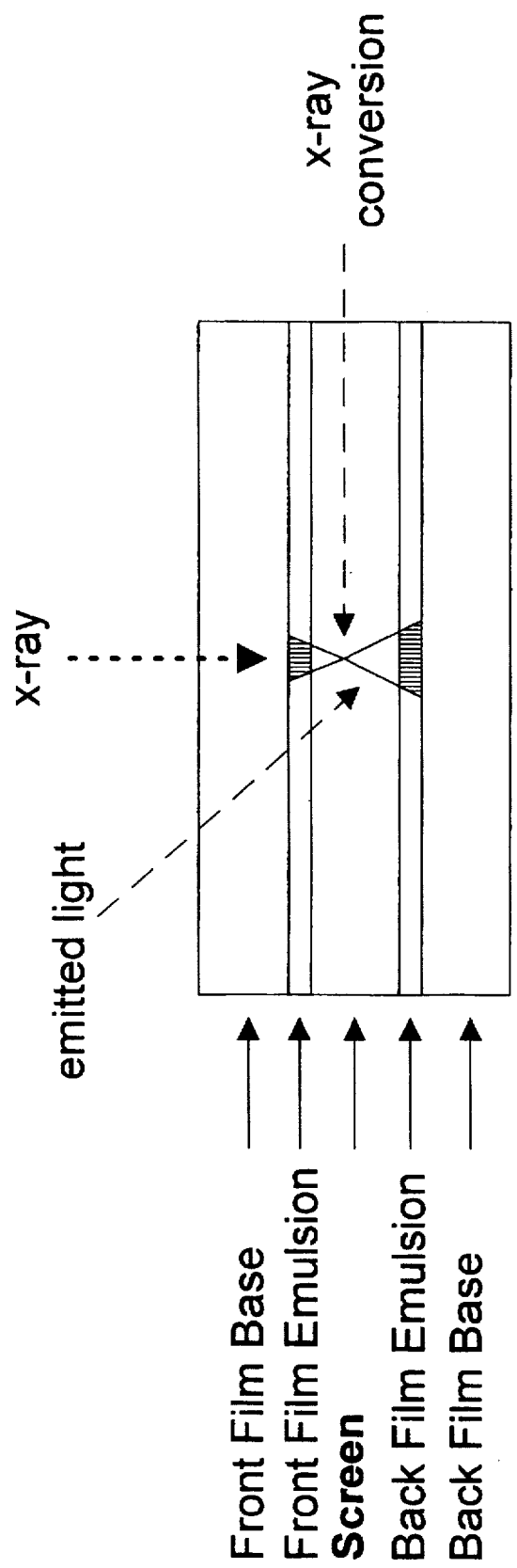
FIG. 2 shows a cross section of a novel single screen-dual film cassette.

A Single Screen-Dual Film Cassette with Improved Lesion Detection in Dense Breast Regions or Compressed Breast Edge Areas A novel single screen-dual film combination is shown in FIG. 2. Compared to current mammographic screen-film cassettes, the design adds a second film to the back of the phosphor screen. In this combination, two film images are obtained from a single x-ray exposure.

The key to enable this design to be used in screen-film mammography is to select the two film speeds so that their latitudes are partially overlapped. FIG. 3 shows the H&D curves of the two films in the single screen-dual film combination where the horizontal axis is the x-ray exposure in units of milliroentgen (mR). The screen can be the Min-R type available from Kodak.

The screen-front film combination is relatively slow in speed compared to the screen-back film combination. The latitudes of the screen-front film and screen-back film combinations are L1 and L2, respectively. The fact that two film images can be produced from a single x-ray exposure results in an effective latitude of L for the single screen-dual film combinations. Preferably, the film contrast of the two films is similar so that the high contrast requirement for breast cancer detection is always satisfied.

The H&D curve of the screen-front film combination can be the same as that of a typical screen-film combination (such as Kodak Min-R Screen/Min-R E Film) currently used in mammography. It produces breast images that are essentially the same as those obtained from current screen-film combinations. The film densities of the dense breast regions often are low on these images. The resulting image contrast of these dense breast regions is generally low.

The H&D curve of the screen-back film combination is designed to extend the film exposure latitude to lower x-ray exposure levels especially in the dense regions of the breast. The response of the screen-back film to x-ray exposure is made to be a factor of about two faster than the screen-front film. For example, a film such as Kodak Min-R H, which has a speed of 1.8 times Kodak Min-R E, meets the requirement. As a result, the dense breast regions have higher film density. The corresponding film contrast is higher than that on the front film. The lesion detectability in the dense breast regions can therefore be improved. This is an important characteristic of this single screen-dual film cassette.

Alternatively, it is also possible to use a slow speed back film so that the H&D curve of the screen-back film moves to a higher exposure level. The response of the screen-back film to x-ray exposure, in this case, may be made to be about a factor of two slower than the screen-front film. As a result, the edge areas around the compressed breast have lower film density. The corresponding film contrast in these areas is higher than that which appears on the front film. Films of other speeds can be obtained or readily prepared by those skilled in the art.

EXAMPLE 2

A Single Screen-Dual Film Cassette with Improved Lesion Detection in the Uniformly Compressed Breast Regions This novel single screen-dual film cassette can have the same structure as shown in FIG. 2. However, the cassette employs a special screen and a special type of film. In this design, the special screen is designed such that the light exiting the back of the screen is about half of that exiting the front of the screen. The same type of films can be used at both sides of the screen. These special films have about half of the film exposure latitude of the standard Kodak Min-R type films, and have significantly higher film contrast.

The effective exposure latitude of this novel single screen-dual film cassette is therefore about the same as that of current screen-film combinations. Advantageously, the contrast for the uniformly compressed breast regions is significantly higher than current screen-film combinations. This improvement in film contrast will enable very low contrast lesions to be seen with enhanced sensitivity in mammography screening.

The use of this novel single screen-dual film cassette is particularly of benefit for mammography of women under the age of 50 whose breasts are composed of mostly fibroglandular tissue.

EXAMPLE 3

Figure 4:
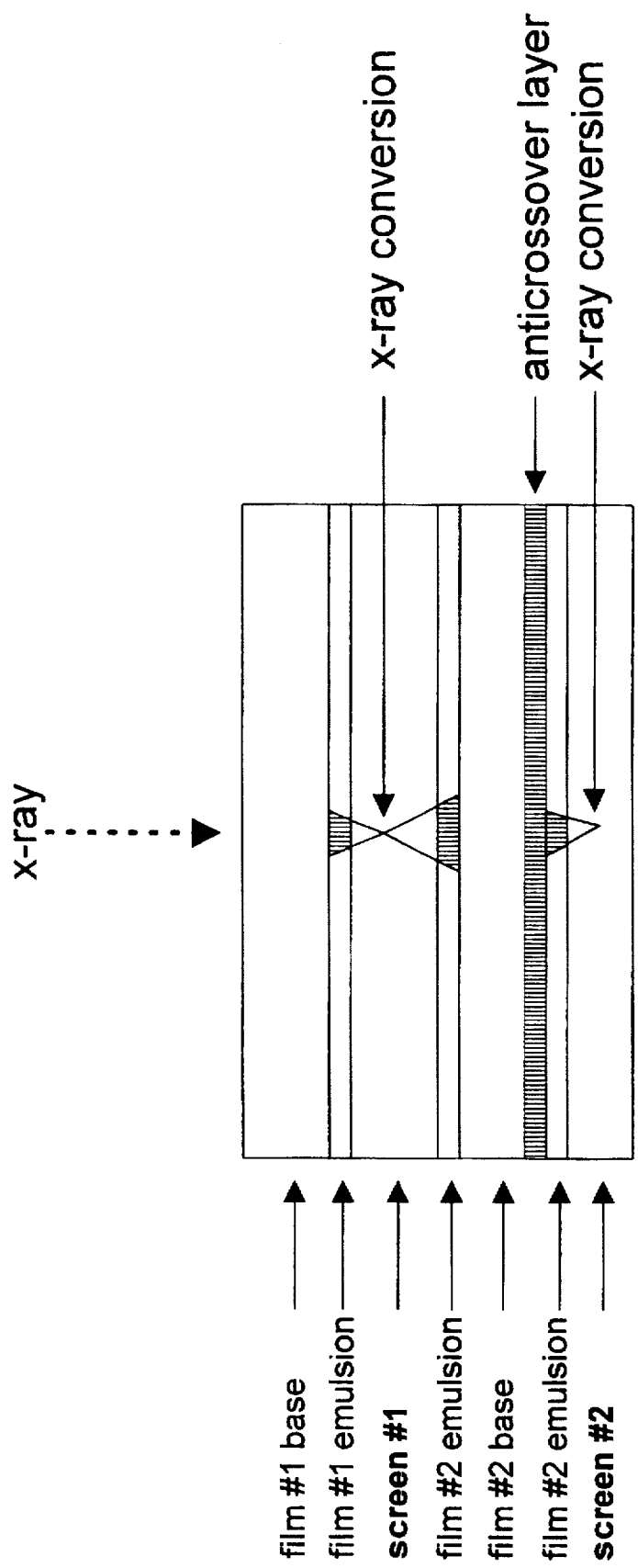
FIG. 4 shows a cross section of a novel dual screen-dual film cassette.
Figure 5:
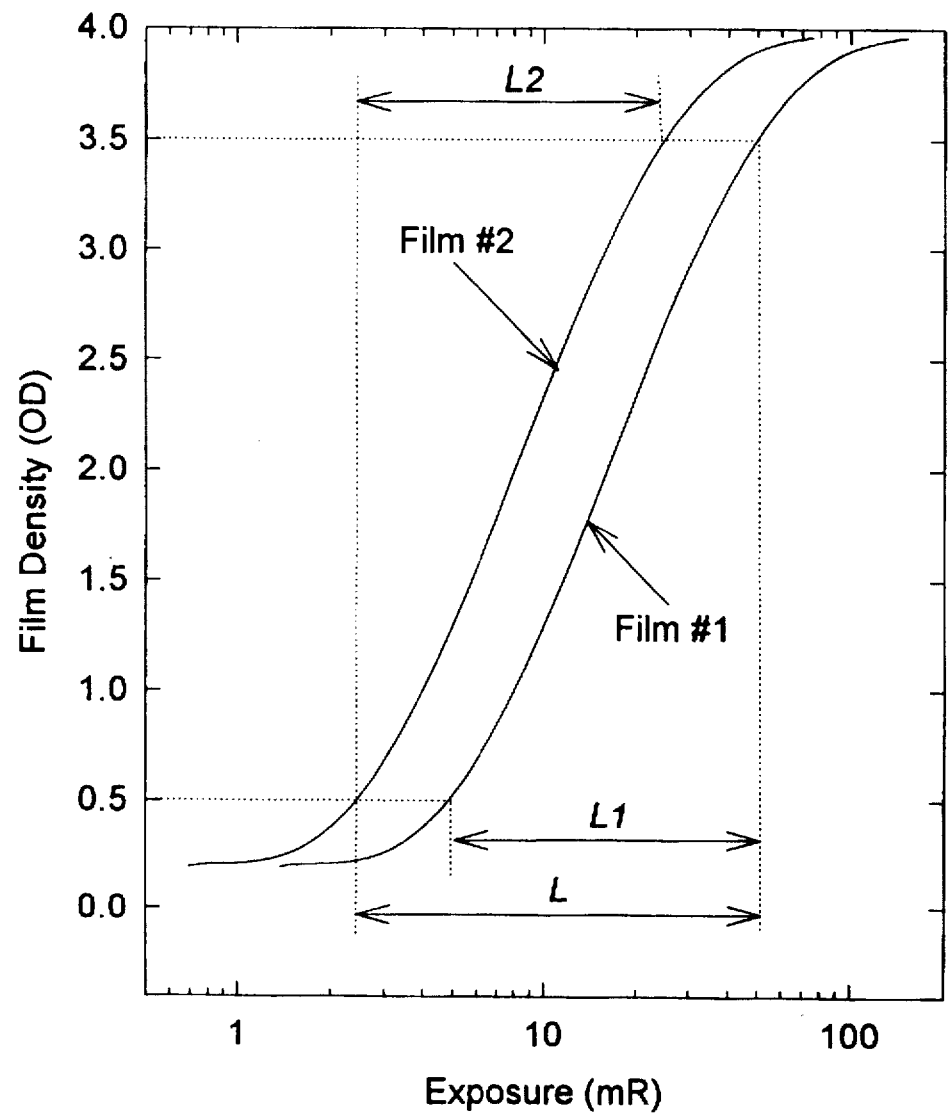
FIG. 5 shows the H&D curves of a dual screen-dual film cassette.

A Dual Screen-Dual Film Cassette with Improved Lesion Detection in Dense Breast Regions A novel dual screen-dual film cassette is shown in FIG. 4. FIG. 5 shows the H&D curves of the two film responses. Film #1 produces breast images that are essentially the same as those obtained from current screen-film combinations. The response of film #2 to x-ray exposure is also a factor of about two faster than film #1. As in Example 1, the choice of film #1 may be Kodak Min R E. However, film #2 is a double emulsion film with an anticrossover layer, for example, Kodak IMG film.

Screen #2 is added to absorb the x-rays penetrating screen #1. This design makes more efficient use of the x-ray exposure to produce high film densities of the dense breast regions on the second film.

EXAMPLE 4

Figure 6:
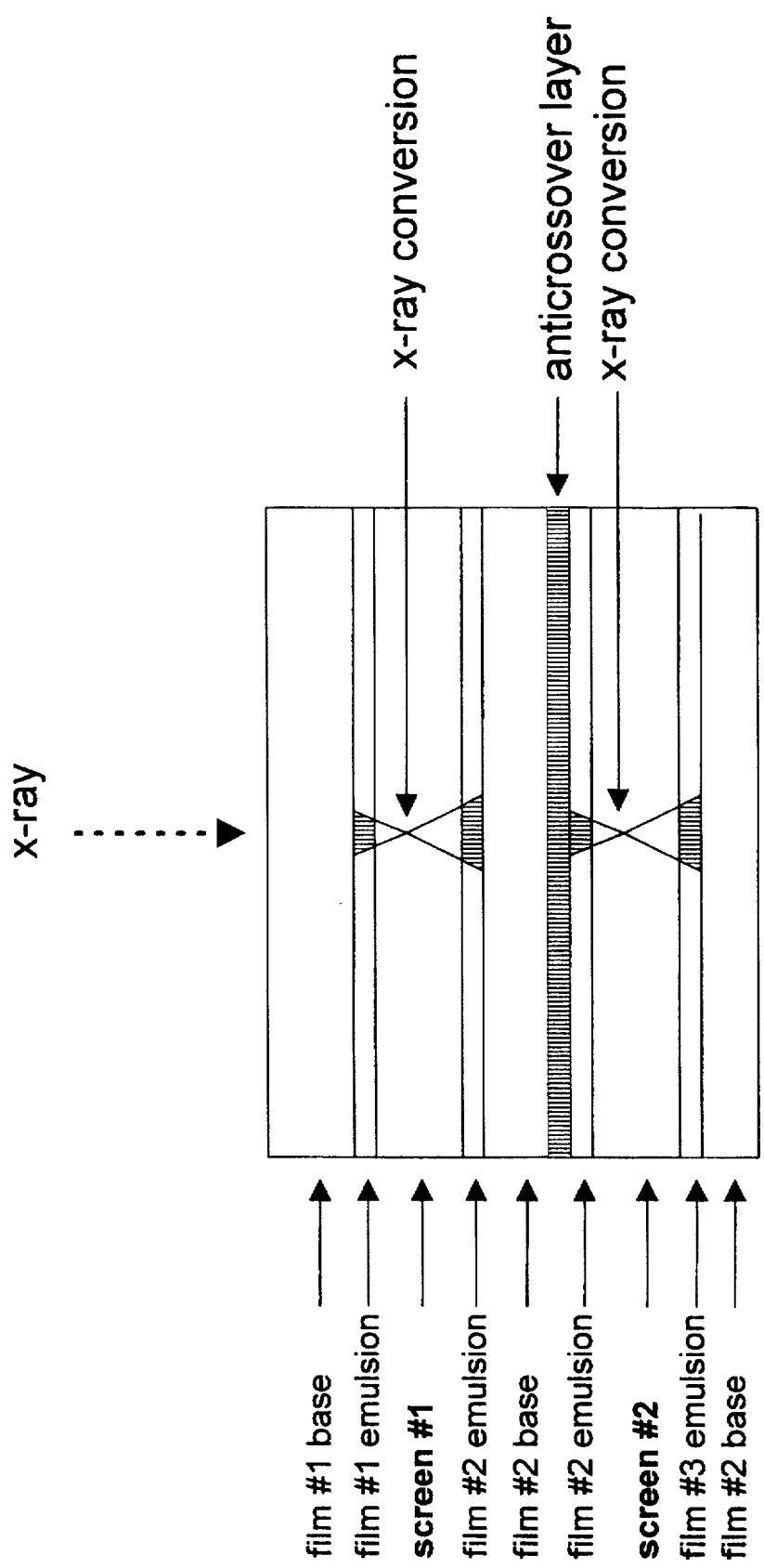
FIG. 6 shows a cross section of a novel dual screen-triple film cassette.

A Dual Screen-Triple Film Cassette with Improved Lesion Detection in Both Dense Breast Regions and Compressed Breast Edge Areas A novel dual screen-triple film cassette is shown in FIG. 6.

Figure 7:
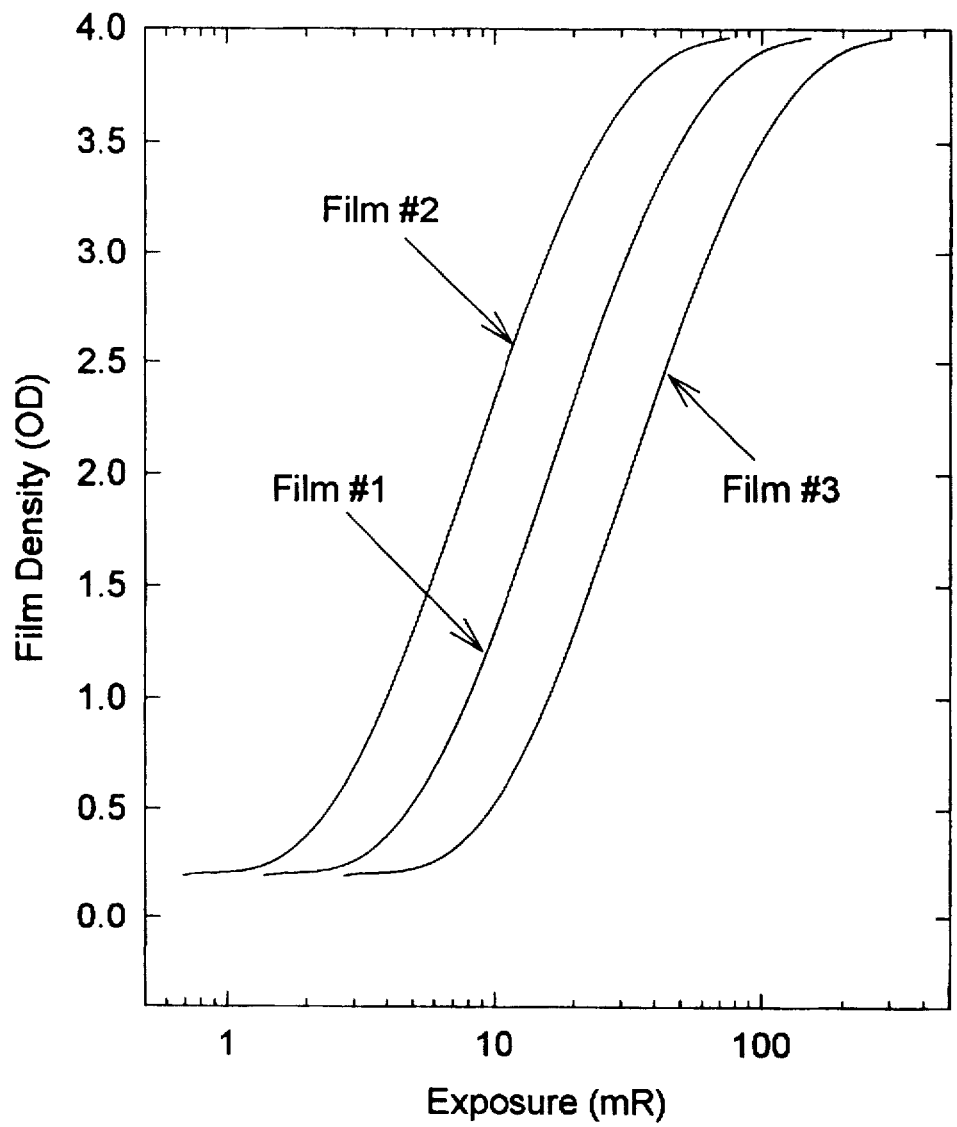
FIG. 7 shows the H&D curves of a dual screen-triple film cassette.

The screens #1 and #2 and films #1 and #2 are the same combinations as discussed in Example 3 and shown in FIG. 4. Additionally, film #3 is identical to film #1 in this design. For the x-ray energies used in mammography, a phosphor screen has a typical x-ray absorption efficiency of about 50% to 70%. The x-ray exposure to screen #2 as shown in FIG. 6 is corresponding lower than the x-ray exposure to screen #1. The effective speed of the screen #2 and film #3 combination is therefore about 2 to 3 times less than that of film #1. The resultant H&D curves for the three films are shown in FIG. 7.

This novel dual screen-triple film cassette therefore has an effective exposure latitude which is about four times wider than current screen-film combinations.

EXAMPLE 5

Figure 8:
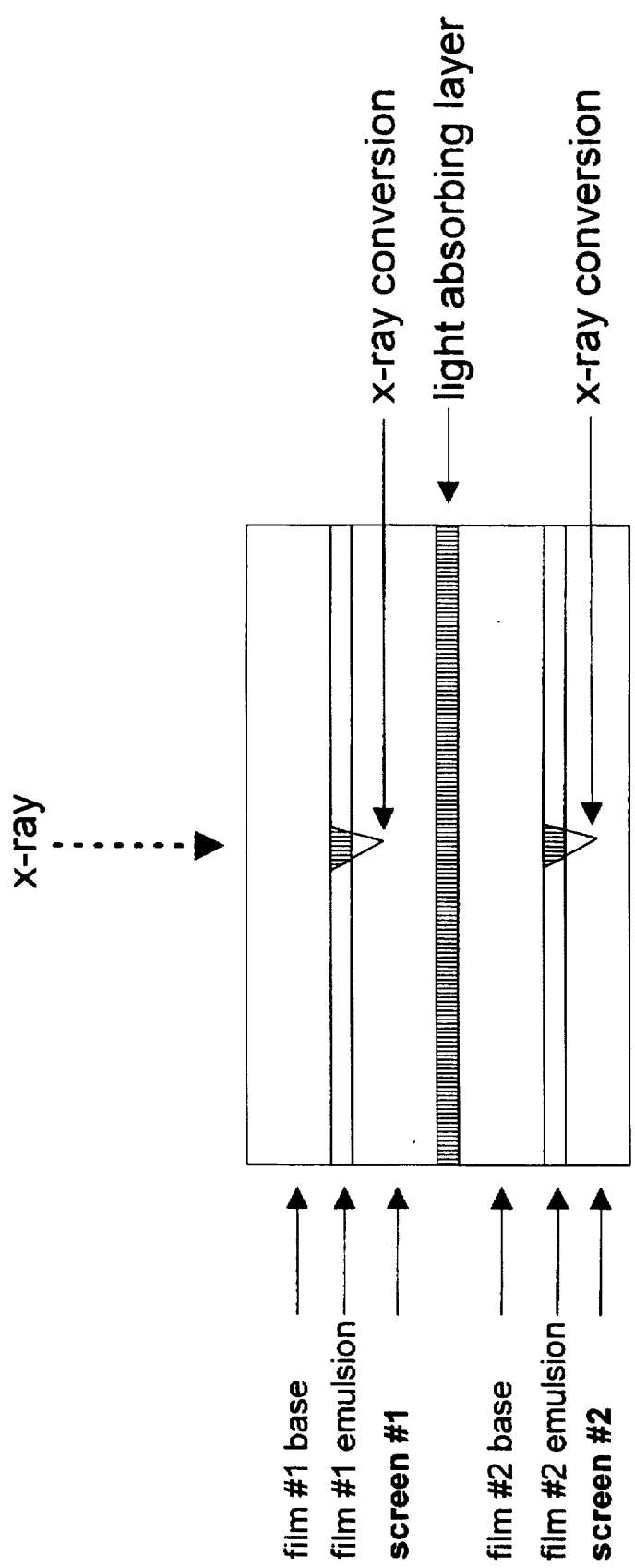
FIG. 8 shows a cross section of a novel dual screen-dual film cassette.
Figure 9:
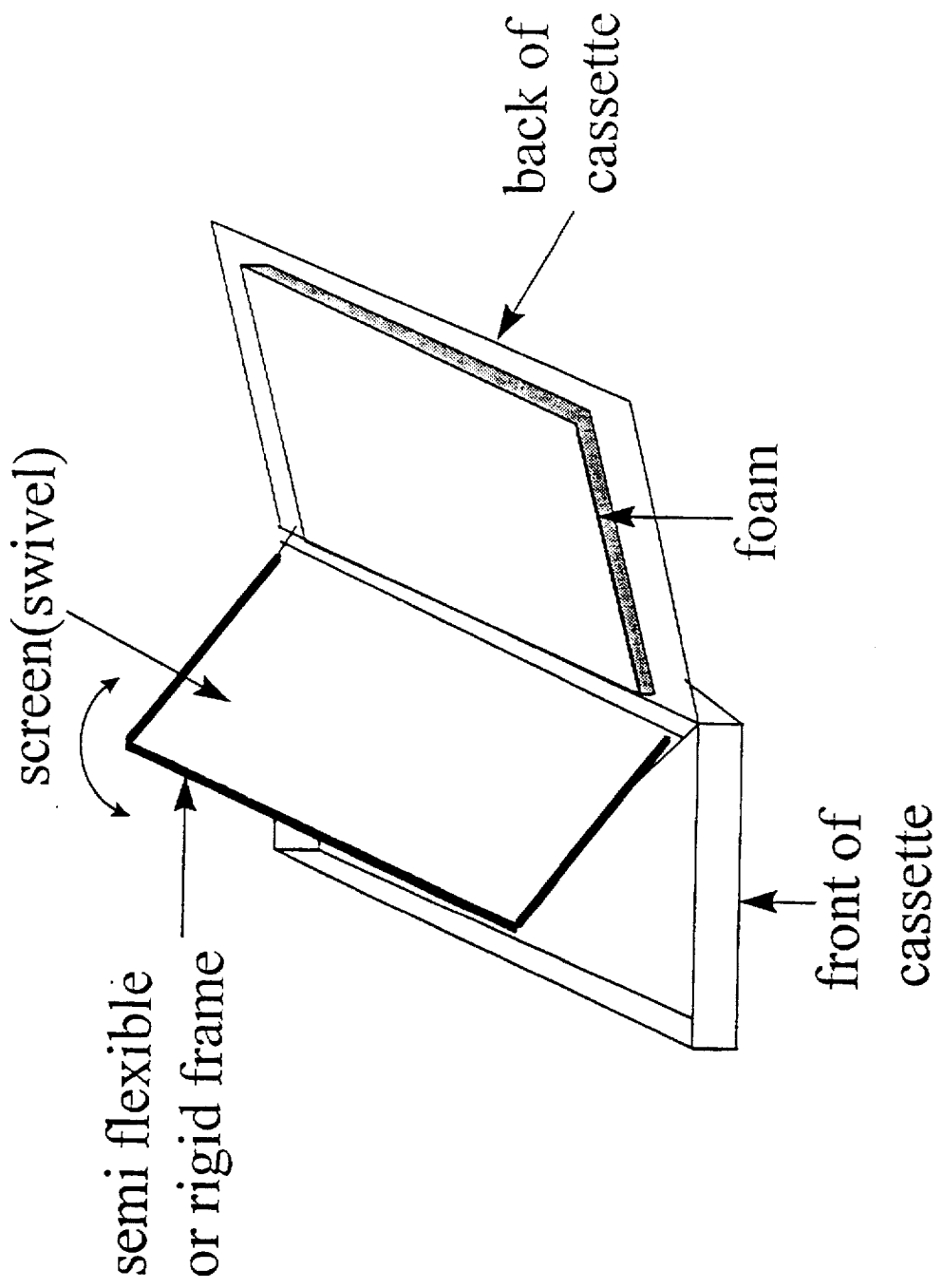
FIG. 9 shows a perspective view of the present invention.
Figure 10:
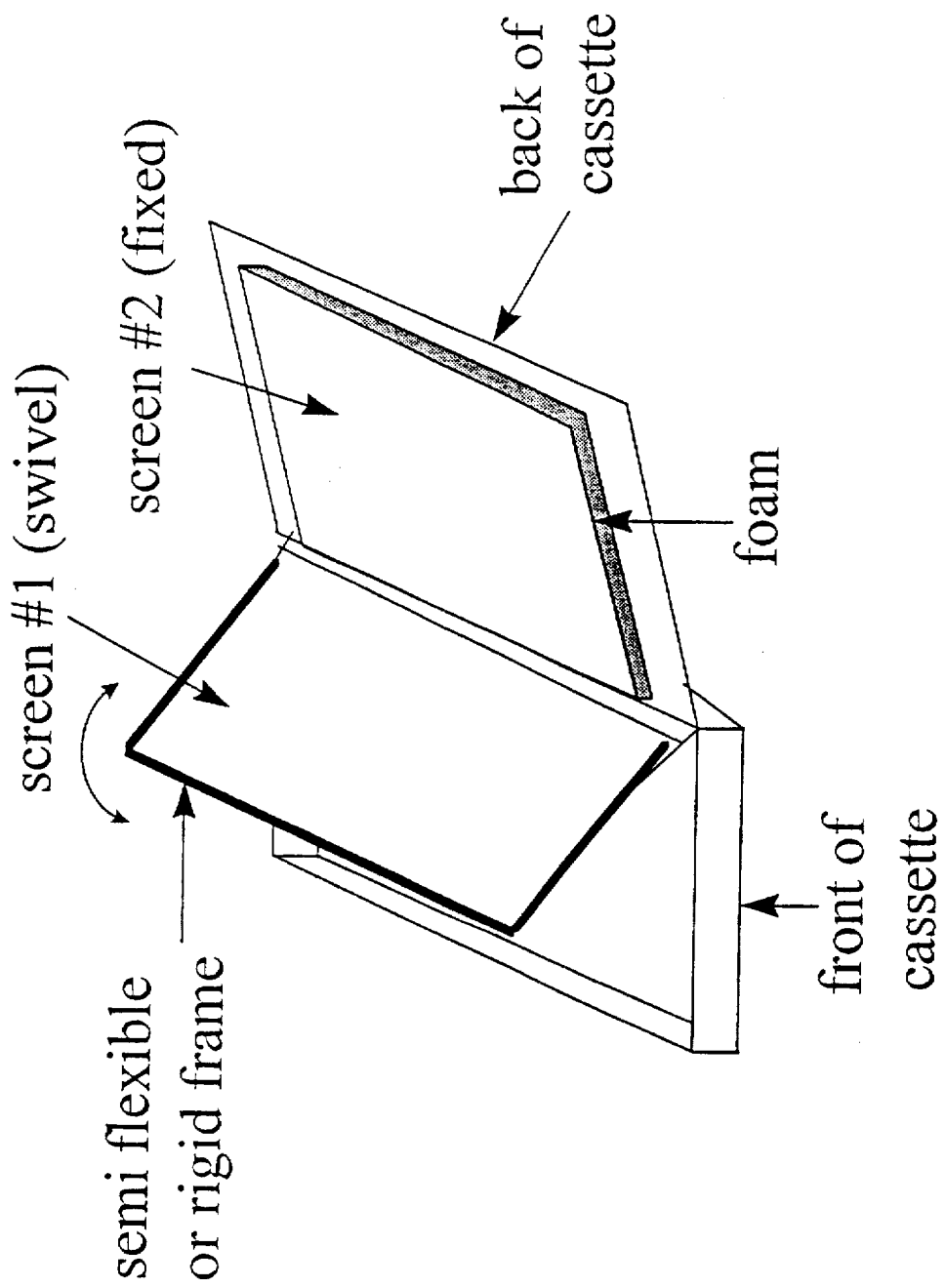
FIG. 10 shows another perspective view of the present invention.
Figure 11:
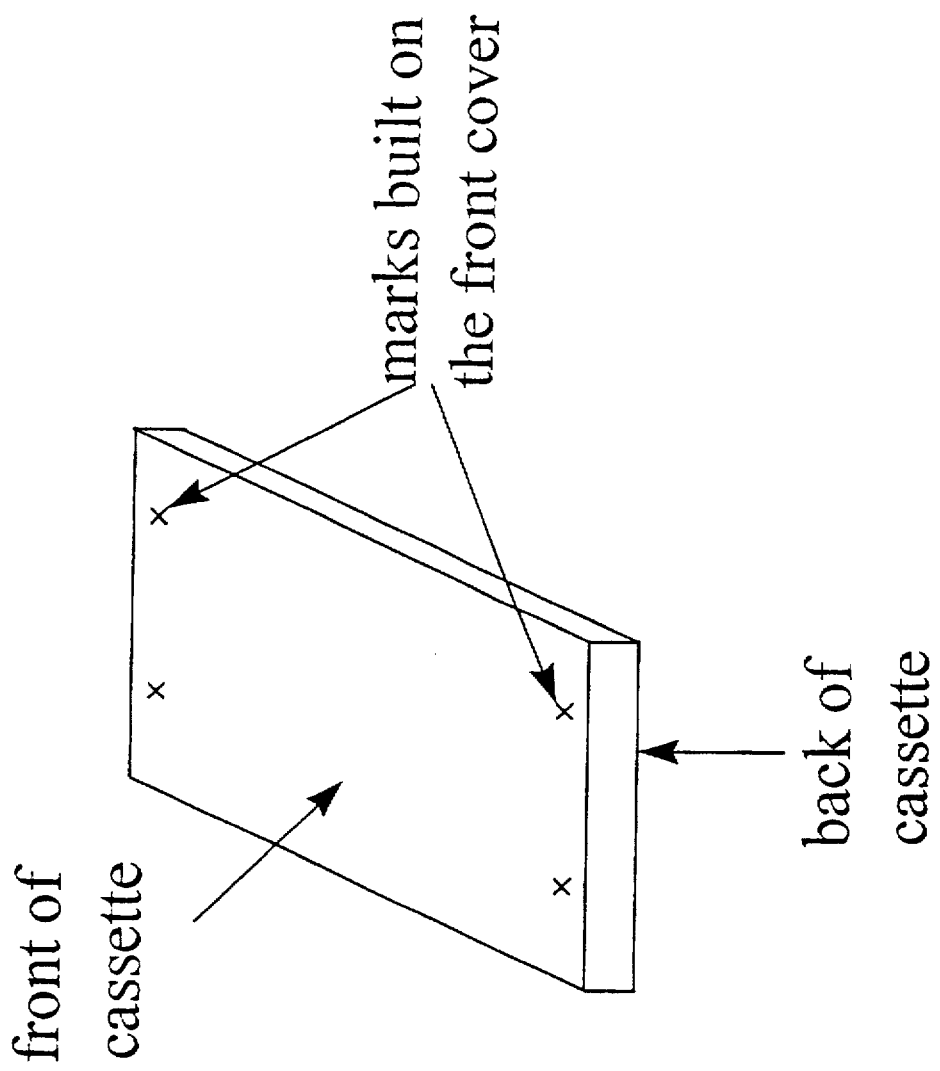
FIG. 11 shows an embodiment of the present invention in a closed cassette.
Figure 12:
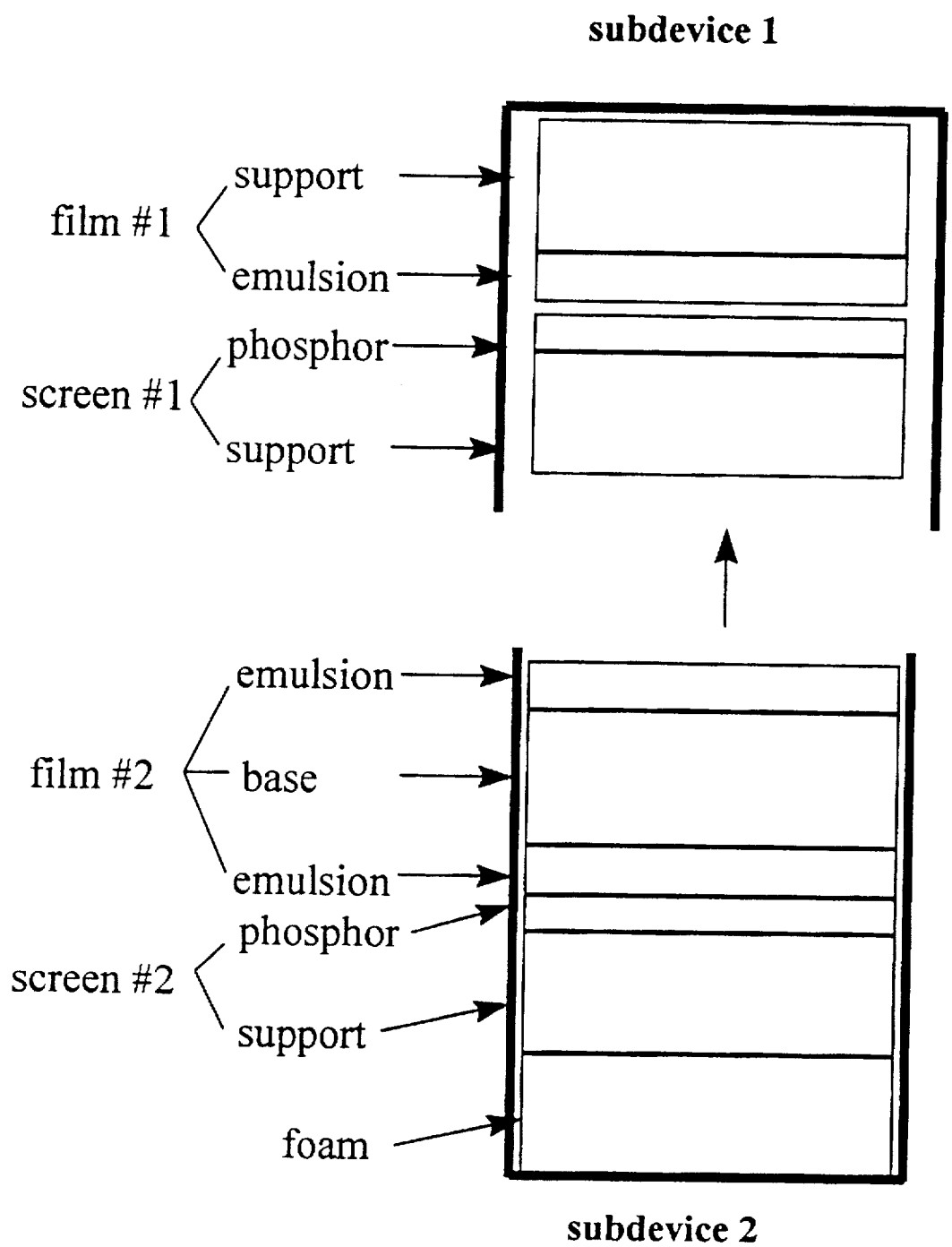
FIG. 12 shows a film-phosphor screen stacking embodiment.

A Dual Screen-Dual Film Cassette with Improved Lesion Detection in Compressed Breast Edge Areas or in Dense Breast Regions A novel dual screen-dual film cassette is shown in FIG. 8. Screen #1 can be, for example, a Kodak Min-R, and Screen #2 can be a Kodak Min-R or a Kodak Min-R medium. Films #1 and #2 are identical, and can be, for example, Kodak Min-R E. The screen #1/film #1 combination produces the normal breast image. Because the x-ray exposure to the screen #2/film #2 combination is about half of the exposure to the screen #1/film #1 combination, a relatively lower density image is obtained on film #2. In this way, the contrast sensitivity is improved in the compressed breast edge area.

An alternative approach with this dual screen-dual film cassette is to produce a normal breast image on film #2. The dense regions of the breast will then be displayed with high contrast on film #1.

EXAMPLE 6

A Dual Screen-Dual Film Cassette with Improved Lesion Detection in the Uniformly Compressed Breast Regions This novel dual screen-dual film cassette can have the same structure as shown in FIG. 8. Screen #1 used in this design can be, for example, the Kodak Min-R screen. Screen #2 can either be the Kodak Min-R screen or the Kodak Min-R medium screen. The choice of screen #2 is determined by the x-ray energy used in mammography. The goal is to generate about an 2:1 ratio in the light output from that of screen #1 to that of screen #2. The special high contrast films, as mentioned in Example #2, may be used in this design. In this way, the effective exposure latitude of this novel dual screen-dual film cassette will be about the same as current screen-film combinations. Improved lesion detectability is again achieved through the use of high contrast films.

It should be understood that the examples and embodiments described herein are for illustrative purposes only and that various modifications or changes in light thereof will be suggested to persons skilled in the art and are to be included within the spirit and purview of this application and the scope of the appended claims.

References

Corney, G. M. (1979) "Sensitometric Properties of Radiographic Films." In: *The Physics of Medical Imaging: Recording System Measurements and Techniques*, AAPM Medical Physics Monograph No. 3, A. G. Haus, ed. New York: American Institute of Physics, pg. 72–82.

Haus, Arthur G. (1992) "Screen-Film Image Receptors and Film Processing," *Syllabus: A Categorical Course in Physics Technical Aspects of Breast Imaging*." Ed. A. G. Haus and M. J. Yaffe. RSNA Publications, Oakbrook, Ill., pg. 69–84.

Johns, P. C. and M. J. Yaffe (1987) "X-ray Characterization of Normal and Neoplastic Breast Tissues," *Phys. Med. Biol.* Vol. 32(6):675–695.

Ma, L. E. Fishell, B. Wright, W. Hanna, S. Allen, N. F. Boyd (1992) "A Controlled Study Of The Factors Associated With Failure To Detect Breast Cancer By Mammography," *J. Natl. Can Inst.* 84:781–785.

Maidment, A. M. A., R. Fahrig, M. J. Yaffe (1993) "Dynamic Range Requirement In Digital Mammography," *Med. Phys.* 20(6):1621–1633.

Skubic, S. E. and P. P. Fatouros (1989) "The Effect Of Breast Composition On Absorbed Dose And Image Contrast," *Med. Phys.* 16:544–552.

We claim:

1. A method for x-ray imaging of a subject wherein said method comprises irradiating said subject such that radiation passing through said subject strikes a screen, said screen comprising a first side and a second side, wherein said screen then emits light from the first side of said screen which exposes a first film and emits light from the second side of said screen which exposes a second film, wherein said second film is a double emulsion film comprising a first emulsion layer and a second emulsion layer, wherein the light emitted by the second side of said screen exposes said first emulsion layer of said second film, wherein said radiation passing through said subject strikes a second screen, wherein said second screen then emits light which exposes said second emulsion layer of said second film.

2. The method, according to claim 1, wherein said screens and films are combined in such a way that the effective speeds of at least two of said films are different by a factor ranging from about 1.5 to about 3.0.

3. The method, according to claim 1, wherein said subject is irradiated only once.

4. The method, according to claim 1, wherein at least two of said films have partially overlapping exposure latitudes.

5. The method, according to claim 1, wherein said method is used for medical diagnostic radiography.

6. The method, according to claim 1, wherein at least one image is made from a double emulsion film with an anti-crossover layer.

7. The method, according to claim 1, wherein said method is used for mammography.

8. The method, according to claim 1, wherein said method is used for industrial radiography.

9. The method, according to claim 1, wherein said screen is a scintillating fiber optic plate.

10. The method, according to claim 1, wherein the light exiting the first side of said screen is about half of the light exiting the second side of said screen.

11. The method, according to claim 1, wherein said radiation passing through said subject strikes a second screen wherein said second screen then emits light which exposes said second film.

12. The method, according to claim 1, wherein said screen and films are combined in such a way that the effective speeds of said first and second films are different by a factor ranging from about 1.5 to about 3.0.

13. The method, according to claim 1, wherein said light which exposes said second film is emitted from a first side of said second screen, wherein said second screen emits light from a second side of said second screen to expose a third film.

14. The method, according to claim 13, wherein at least two of said films have the same or similar exposure latitude and film contrast.

15. The method, according to claim 13, wherein said screens and films are combined in such a way that the effective speeds of at least three of said films are in the ratio of 1:(1.5 to about 3):(2.5 to about 6).

16. The method, according to claim 1, further comprising the steps of: processing said exposed films to produce at least two film images; and producing a single composite digital image from said film images.

17. The method, according to claim 16, further comprising the step of: marking, by way of a marking means, each film image with at least one mark, wherein the marks of the different film images are correlated such as to allow alignment of said film images with each other.

18. The method, according to claim 17, wherein before the step of producing a single composite digital image, said method further comprises the step of aligning said film images with respect to each other.

19. The method, according to claim 16, wherein the step of producing a single composite digital image from said film images is accomplished by a digital scanner and a computer.

20. The method, according to claim 16, wherein before the step of producing a single composite digital image, said method further comprises the step of scaling each film image to a given image size.

21. The method, according to claim 16, wherein said composite digital image has a latitude which is bounded by the extremes of the partially overlapping individual latitudes of said film images.

22. A device for radiological imaging comprising a screen comprising a first side and a second side, wherein said device can accommodate at least two films such that a single exposure to radiation causes said screen to emit light from the first side of said screen which exposes a first film and to emit light from the second side of said screen which exposes a second film and a second screen, wherein said second film is a double emulsion film comprising a first emulsion layer and a second emulsion layer, wherein the light emitted by the second side of said screen exposes said first emulsion layer of said second film, wherein said single exposure to radiation causes said second screen to emit light which exposes said second emulsion layer of said second film.

23. The device, according to claim 22, wherein at least one of said screens is a phosphor screen.

24. The device, according to claim 22, wherein at least one of said screens is a scintillating fiber optic plate.

25. The device, according to claim 22, further comprising at least two films having partially overlapping exposure latitudes.

26. The device, according to claim 22, further comprising at least two films, wherein said screens and said films are combined in such a way that the effective speeds of at least two of said films are different by a factor ranging from about 1.5 to about 3.0.

27. The device, according to claim 22, wherein said light which exposes said second film is emitted from a first side of said second screen, wherein said second screen emits light from a second side of said second screen to expose a third film.

28. The device, according to claim 27, further comprising at least three films, wherein said screens and said films are combined in such a way that the effective speeds of at least three of said films are in the ratio of 1:(1.5 to about 3.0):(2.5 to about 6).

29. The device, according to claim 22, wherein said screens remain in the device.

30. The device, according to claim 29, wherein said screens are connected to the device by a connecting means permitting movement of at least one of said screens to facilitate the placement of films either between said screens and/or on an outer face of said screens.

31. The device, according to claim 30, wherein at least one of said screens has a semi flexible or rigid frame around at least one edge, thereby permitting removal without touching the surfaces of the screen(s).

32. The device, according to claim 22, wherein the screens has a semi flexible or rigid frame around at least one edge.

33. The device in claim 22, further comprising at least two subdevices, each subdevice housing at least one of said screens and accommodating at least one of said films.

34. The device, according to claim 22, further comprising a marking means, wherein when said device is exposed to x-rays, each film produces a film image and at least one mark is produced on each film image.

35. The device, according to claim 34, wherein said marks provide accurate spatial references on each film image relative to the other of said film images.

36. The device, according to claim 35, wherein said film images are digitized and can be of different sizes, wherein said spatial references can be used to scale said film images of different sizes to a single size.

37. The device, according to claim 22, further comprising a second screen, wherein said single exposure to radiation causes said second screen to emit light which exposes said second film.

38. The device, according to claim 22, wherein said screen is a scintillating fiber optic plate.

39. The device, according to claim 22, wherein said screen and said first and second films are combined in such a way that the effective speeds of said first and second films are different by a factor ranging from about 1.5 to about 3.0.

* * * * *